US011678024B2

(12) United States Patent
Sun et al.

(10) Patent No.: US 11,678,024 B2
(45) Date of Patent: Jun. 13, 2023

(54) SUBTITLE INFORMATION DISPLAY METHOD AND APPARATUS, AND ELECTRONIC DEVICE, AND COMPUTER READABLE MEDIUM

(71) Applicant: Beijing Bytedance Network Technology Co., Ltd., Beijing (CN)

(72) Inventors: Yingzhao Sun, Beijing (CN); Xingdong Li, Beijing (CN); Haiting Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/868,503

(22) Filed: Jul. 19, 2022

(65) Prior Publication Data

US 2022/0353586 A1 Nov. 3, 2022

Related U.S. Application Data

(63) Continuation of application No. PCT/CN2020/127221, filed on Nov. 6, 2020.

(30) Foreign Application Priority Data

Jan. 21, 2020 (CN) .......................... 202010072502.0

(51) Int. Cl.
 *H04N 21/488* (2011.01)
 *G11B 27/036* (2006.01)
 (Continued)

(52) U.S. Cl.
 CPC ....... *H04N 21/4884* (2013.01); *G11B 27/036* (2013.01); *H04N 5/2628* (2013.01);
 (Continued)

(58) Field of Classification Search
 CPC ........... H04N 21/4884; H04N 21/4312; H04N 21/4886; H04N 21/4888; H04N 21/488;
 (Continued)

(56) References Cited

U.S. PATENT DOCUMENTS 11,070,891 B1 * 7/2021 Effinger ........... H04N 21/43072
2004/0004640 A1 1/2004 Iida
 (Continued)

FOREIGN PATENT DOCUMENTS

CN 102210162 A 10/2011
CN 102379122 A 3/2012
 (Continued)

OTHER PUBLICATIONS

International Search Report issued in International Patent Application No. PCT/CN2020/127221 dated Feb. 5, 2021.
 (Continued)

*Primary Examiner* — Alazar Tilahun
(74) *Attorney, Agent, or Firm* — ArentFox Schiff LLP

(57) ABSTRACT

A subtitle information display method includes: when an editing operation of a user for initial subtitle information of video information is detected, determining a video display region and an edited subtitle display region in an application display page; if the subtitle display region is not a subregion in the video display region, determining a first extension length and a first extension direction for each edge length of the video display region based on region information of the video display region and region information of the subtitle display region; extend the video display region within a region range corresponding to the application display page, based on the first extension length and the first extension direction, so that the extended video display region includes the subtitle display region; and displaying edited subtitle information in the subtitle display region.

18 Claims, 2 Drawing Sheets

(51) Int. Cl.
*H04N 21/431* (2011.01)
*H04N 5/262* (2006.01)
*H04N 13/183* (2018.01)
*H04N 21/485* (2011.01)

(52) U.S. Cl.
CPC ....... *H04N 13/183* (2018.05); *H04N 21/4312* (2013.01); *H04N 21/488* (2013.01); *H04N 21/4858* (2013.01)

(58) Field of Classification Search
CPC ............. H04N 21/4882; H04N 5/2628; H04N 21/4858; H04N 21/4316; H04N 5/2226; H04N 13/183; G11B 27/036
See application file for complete search history.

(56) References Cited

U.S. PATENT DOCUMENTS

| | | | |
|---|---|---|---|
| 2009/0027552 A1* | 1/2009 | Yang | H04N 7/0122 348/465 |
| 2011/0205430 A1* | 8/2011 | Minagawa | H04N 7/162 348/468 |
| 2012/0013799 A1 | 1/2012 | Murayama | |
| 2012/0281139 A1 | 11/2012 | Zhang et al. | |
| 2013/0308922 A1 | 11/2013 | Sano et al. | |
| 2014/0240472 A1 | 8/2014 | Hamasaki et al. | |
| 2019/0028757 A1 | 1/2019 | Tsukagoshi et al. | |

FOREIGN PATENT DOCUMENTS

| | | |
|---|---|---|
| CN | 102724458 A | 10/2012 |
| CN | 103503455 A | 1/2014 |
| CN | 103533256 A | 1/2014 |
| CN | 106210838 A | 12/2016 |
| CN | 108476341 A | 8/2018 |
| CN | 110177295 A | 8/2019 |
| CN | 111225288 A | 6/2020 |
| EP | 3319325 A1 | 5/2018 |
| JP | H11261890 A | 9/1999 |

OTHER PUBLICATIONS

Extended European Search Report in EP201915002.8, dated Dec. 7, 2022, 3 pages.

* cited by examiner

SUBTITLE INFORMATION DISPLAY METHOD AND APPARATUS, AND ELECTRONIC DEVICE, AND COMPUTER READABLE MEDIUM

CROSS REFERENCE TO RELATED APPLICATION

The present disclosure is a continuation of International Application No. PCT/CN2020/127221, filed on Nov. 6, 2020, which claims the priority to Chinese Patent Application No. 202010072502.0 filed on Jan. 21, 2020 with the China National Intellectual Property Administration, both of which are incorporated herein by reference in their entireties.

FIELD

The present disclosure relates to the field of computer technology, and in particular to a method and an apparatus for displaying subtitle information, an electronic device, and a computer readable medium.

BACKGROUND

When a video is played through an application, subtitles corresponding to the video are generally displayed. A user may edit the subtitles before releasing the video. A common occurrence is that a display region of the edited subtitles exceeds a range of a video display region. In this case, after the video is released, only subtitle information within the range of the video display region may be displayed on an application display page, while subtitle information outside the range of the video display region may not be displayed, resulting in incomplete display of subtitle information.

SUMMARY

The summary is provided to introduce concepts in a simplified form that are described in detail in the following detailed description. The summary is not intended to identify key features or essential features of the claimed technical solution, nor is it intended to limit the scope of the claimed technical solution.

In a first aspect of the present disclosure, a method for displaying subtitle information is provided. The method includes:

determining a video display region in an application display page and a subtitle display region after an editing operation, in response to a detection of the editing operation of a user for initial subtitle information of video information;

determining a first extension length and a first extension direction for each of edges of the video display region based on region information of the video display region and region information of the subtitle display region, if the subtitle display region is not a subregion of the video display region;

extending the video display region within a region range corresponding to the application display page based on the first extension length and the first extension direction, where the extended video display region includes the subtitle display region; and displaying edited subtitle information in the subtitle display region.

In a second aspect of the present disclosure, an apparatus for displaying subtitle information is provided. The apparatus includes a first determination module, a second determination module, an extension module, and a display module.

The first determination module is configured to determine a video display region in an application display page and an subtitle display region after an editing operation, in response to a detection of the editing operation of a user for initial subtitle information of video information.

The second determination module is configured to determine a first extension length and a first extension direction for each of edges of the video display region based on region information of the video display region and region information of the subtitle display region, if the subtitle display region is not a subregion included in the video display region.

The extension module is configured to extend the video display region within a region range corresponding to the application display page based on the first extension length and the first extension direction, where the extended video display region includes the subtitle display region.

The display module is configured to display edited subtitle information in the subtitle display region.

In a third aspect of the present disclosure, an electronic device is provided. The electronic device includes a memory and a processor.

A computer program is stored in the memory.

The processor is configured to execute the computer program to perform the method according to any one of the first aspect.

In a fourth aspect of the present disclosure, an computer readable medium storing a computer program thereon is provided, wherein the computer program, when executed by a processor, causes the processor to perform the method according to any one of the first aspect.

The beneficial effects of the technical solution provided by the present disclosure are as follows.

In this embodiment, a video display region and an edited subtitle display region may be determined, when it is detected that the user performs an editing operation on initial subtitle information. A first extension length and a first extension direction for each of edges of the video display region may be determined based on region information of the video display region and region information of the subtitle display region, if the subtitle display region is not a subregion included in the video display region. In this case, based on the first extension length and the first extension direction, the video display region is extended within a region range corresponding to the application display page, such that the extended video display region may include the subtitle display region. In this way, after the video is released, complete subtitle information may be displayed to the user in the subtitle display region. In the present disclosure, the video display region is extended, and the extended video display region may include the subtitle display region, such that complete subtitle information may be displayed, which ensures the completeness of the subtitle display, may adapt to the diverse display requirements of subtitle information, is suitable for more scenarios, and improves the user experience.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

DETAILED DESCRIPTION OF EMBODIMENTS

Figure 1:
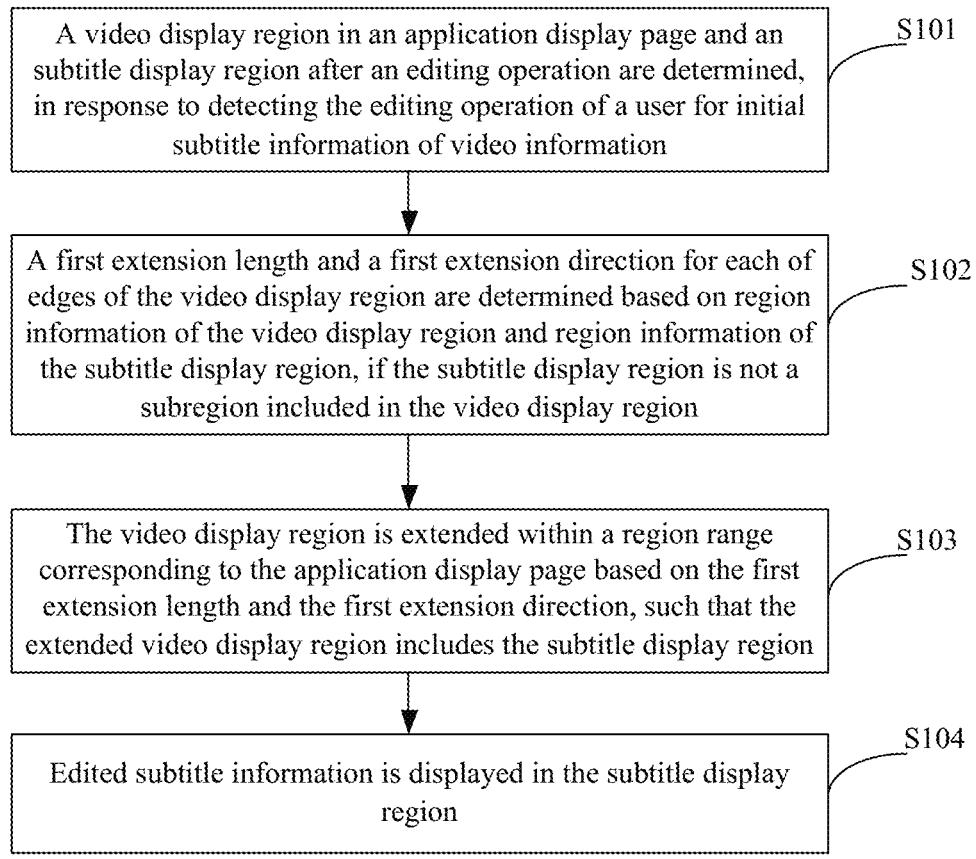
FIG. 1 is a schematic diagram of a method for displaying subtitle information according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that concepts such as "first" and "second" mentioned in the present disclosure are only used to distinguish apparatuses, modules or units, are not intended to limit the apparatuses, modules or units to be necessarily different apparatuses, modules or units, and are also not intended to limit an sequential order or interdependence of the functions performed by the apparatuses, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

Referring to FIG. 1, a method according to the present disclosure may be executed by a client device. The method includes the following steps S101 to S104.

In step S101, a video display region in an application display page and an subtitle display region after an editing operation are determined, in response to a detection of the editing operation of a user for initial subtitle information of video information.

A function of extending the video display region of the client device may be automatically triggered, when detecting the editing operation of the user for the initial subtitle information of the video information. The client device determines the video display region in the application display page (in this embodiment, unless otherwise specified, the video display region refers to the video display region before the extension) and the subtitle display region after the editing operation of the user is completed. The video display region is generated by the client device by adapting to a size of the application display page.

In step S102, a first extension length and a first extension direction for each of edges of the video display region are determined based on region information of the video display region and region information of the subtitle display region, if the subtitle display region is not a subregion included in the video display region.

In this embodiment, a possible situation where the subtitle display region (in this embodiment, unless otherwise specified, the subtitle display region refers to the subtitle display region after the editing operation) is not any subregion included in the video display region is that the video display region and the subtitle display region partially overlap, and both the video display region and the subtitle display region are within a region range of a canvas. A size of the canvas is generally a size of the application display page. Another possible situation is that the video display region and the subtitle display region are two independent regions, and both the video display region and the subtitle display region are within the region range of the canvas.

The client device may determine the first extension direction and the first extension length for each of the edges of the video display region, based on the region information of the video display region and the region information of the subtitle display region after the editing operation. The edges of the video display region may refer to a height and a width of the video display region. The first extension direction may be to extend upward or downward in the height direction, or extend left or right in the width direction.

In step S103, the video display region is extended within a region range corresponding to the application display page based on the first extension length and the first extension direction, such that the extended video display region includes the subtitle display region.

In step S104, edited subtitle information is displayed in the subtitle display region.

Based on the first extension length and the first extension direction for each of the edges, the client device may extend the edge of the video display region for a specific length in the extension direction, within the region range corresponding to the application display page (i.e., the region range corresponding to the canvas). Therefore, the video display region is extended, such that the extended video display region includes the above edited subtitle display region. That is, the subtitle display region is a subregion of the extended video display region. In this way, after the video is released, the client device may display the edited subtitle information in the subtitle display region, and the edited subtitle information may be displayed completely.

In this embodiment, a video display region and a subtitle display region after the editing operation may be determined in a case of detecting an editing operation of a user for initial subtitle information. A first extension length and a first extension direction for each of edges of the video display region may be determined based on region information of the video display region and region information of the subtitle display region, if the subtitle display region is not a subregion included in the video display region. In this case, based on the first extension length and the first extension direction, the video display region is extended within a region range corresponding to the application display page, such that the extended video display region may include the subtitle display region. In this way, after the video is released, complete subtitle information may be displayed to the user in the subtitle display region. In the present disclosure, the video display region is extended, and the extended video display region may include the subtitle display region, such that complete subtitle information may be displayed, which ensures the completeness of the subtitle display, may adapt to the diverse display requirements of subtitle information, is suitable for more scenarios, and improves the user experience.

According to an embodiment of the present disclosure, the editing operation includes at least one of the following: adjusting a font color of a subtitle, adjusting a font size of the subtitle, adjusting text content of the subtitle, adjusting a position of the subtitle display region, adjusting a size of the subtitle display region, and adjusting a shape of the subtitle display region.

In this embodiment, the editing operation of a user for initial subtitle information may include: adjusting the font color or adjusting the font size. Generally, when the font becomes larger, the subtitle display region is expanded. In addition, the editing operation of the user for the initial subtitle information may further include operations of adding, deleting and modifying the text content of the subtitle. The addition, deletion or modification of the text content may change the size of the subtitle display region. In addition, the editing operation of the user for the initial subtitle information may further include: adjusting the position of the subtitle display region. For example, the subtitle display region in the video display region is dragged to the outside of the video display region. In addition, the editing operation of the user for the initial subtitle information may further include: adjusting the size of the subtitle display region, such as expanding the subtitle display region. In this case, part of the subtitle display region may exceed the region range corresponding to the video display region. In addition, the editing operation of the user for the initial subtitle information may further include: adjusting the shape of the subtitle display region, such as changing the height and width of the subtitle display region.

According to an embodiment of the present disclosure, region information of any display region includes coordinates of endpoints of the display region.

The determining the first extension length and the first extension direction for each of the edges of the video display region, based on the region information of the video display region and the region information of the subtitle display region includes:

determining a positional relationship between the video display region and the subtitle display region based on coordinates of endpoints of the video display region and coordinates of endpoints of the subtitle display region;

determining the first extension direction for each of the edges of the video display region based on the positional relationship; and determining, for each of the edges of the video display region, a coordinate of a first target endpoint from the coordinates of the endpoints of the video display region and a coordinate of a second target endpoint from the coordinates of the endpoints of the subtitle display region, based on the first extension direction of the edge, and determining the first extension length of the edge based on the coordinate of the first target endpoint and the coordinate of the second target endpoint.

In this embodiment, the region information of the video display region (which refers to the video display region before the extension in this embodiment) may include the coordinates of the endpoints of the video display region. The region information of the subtitle display region (which refers to the subtitle display region after the editing operation in this embodiment) may include the coordinates of the endpoints of the subtitle display region.

Figure 2:
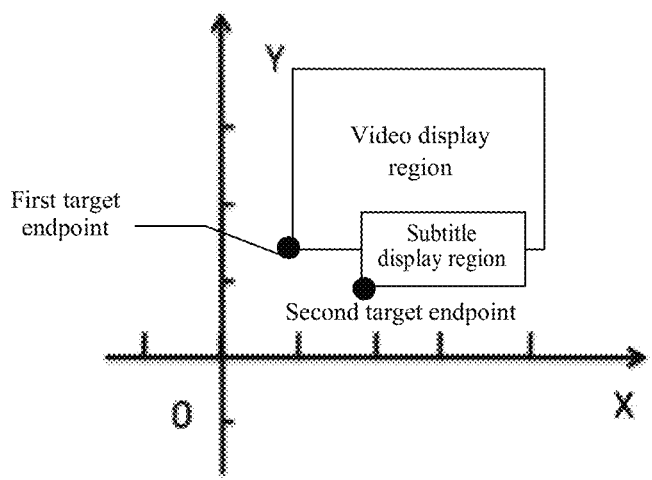
FIG. 2 is a schematic diagram of an extension of a video display region according to an embodiment of the present disclosure.

In a coordinate system corresponding to the application display page, the positional relationship between the video display region and the subtitle display region may be determined based on the coordinates of the endpoints of the video display region and the coordinates of the endpoints of the subtitle display region. The first extension direction for each of the edges of the video display region may be determined based on the positional relationship. For example, as shown in FIG. 2, in a vertical dimension, the subtitle display region is below the video display region, and thus the video display region may be extended downward in the height direction.

For each of the edges of the video display region, based on the first extension direction of the edge, the coordinate of the first target endpoint may be determined from the coordinates of the endpoints of the video display region, and the coordinate of the second target endpoint may be determined from the coordinates of the endpoints of the subtitle display region. Based on the coordinate of the first target endpoint and the coordinate of the second target endpoint, a coordinate extension distance in a dimension where the edge is located is determined. The coordinate extension distance is converted into the first extension length on the application display page. For example, as shown in FIG. 2, in the scenario where the video display region is extended downward in the height direction, the coordinate of the first target endpoint is the minimum coordinate on the y-axis among the coordinates of the endpoints of the video display region, and the coordinate of the second target endpoint is the minimum coordinate on the y-axis among the coordinates of the endpoints of the subtitle display region. A difference between the coordinate of the first target endpoint and the coordinate of the second target endpoint on the y-axis is calculated. The difference is the coordinate extension distance in the height direction. The coordinate extension distance is converted into the first extension length in the height direction. Similarly, in a scenario where the video display region in FIG. 2 may also be extended to the right, for the width of the video display region, the coordinate of the first target endpoint is the maximum coordinate on the x-axis among the coordinates of the endpoints of the video display region, and the coordinate of the second target endpoint is the maximum coordinate on the x-axis among the coordinates of the endpoints of the subtitle display region. A difference between the coordinate of the first target endpoint and the coordinate of the second target endpoint on the x-axis is calculated. The difference is the coordinate extension distance in the width direction. The coordinate extension distance is converted into the first extension length in the width direction.

In this embodiment, the coordinates of the endpoints may also be normalized, to limit x values and y values of the coordinates of the endpoints within a range of 0 to 1.

In this embodiment, a newly added region obtained by extending the video display region may be rendered as a specific background color. For example, the newly added region is filled with black.

According to an embodiment of the present disclosure, before the detecting the editing operation of the user for the initial subtitle information, the method further includes:

acquiring video data to be processed, and obtaining audio information based on the video data;

sending the audio information to a server, to obtain the initial subtitle information by the server performing text recognition on the audio information; and receiving the initial subtitle information from the server.

In this embodiment, the client device acquires video data to be processed. The video data may be video data uploaded by the user, or video data obtained from a video stream of the server. The client device may send the video data to be processed to the server. A text recognition model obtained by training is preset in the server. Text recognition is performed on audio information in the video data by using the text recognition model, to recognize the initial subtitle information. Alternatively, the client device may extract the audio information from the video data. The client device sends the audio information to the server. Similarly, the server performs text recognition on audio data through the text recognition model to obtain the initial subtitle information. By the way of extracting the audio information by the client device, the data processing pressure of the server may be reduced, the return of the initial subtitle information to the client device may be accelerated, and the time delay of data processing is reduced.

The client device may process the video data to be processed, to obtain video information. The specific processing process includes: encoding and rendering the video data. In this way, the video information and the initial subtitle information may be displayed on the application display page. The video information may be displayed in the video display region before the extension on the application display page in a preview mode. The initial subtitle information may be displayed in the subtitle display region before the editing operation on the application display page in the preview mode. That is, the display situations of the video and the subtitle after the video is released is displayed to the user in the preview mode. It should be understood that providing the display situations of the video and the subtitle displayed in the preview mode may include: only providing a relative position relationship between the video display region and the subtitle display region. That is, the relative position relationship between the two display regions (the video display region before the extension and the subtitle display region before the editing operation) remains unchanged, while the sizes of the two display regions after the actual release may be different from the sizes of the two display regions provided in the preview mode.

Before the video is released, the user may edit the initial subtitle information, based on the video information and the initial subtitle information displayed in the preview mode. After the user edits the initial subtitle information, the client device displays the video information and the edited initial subtitle information in the preview mode. The same video information may be displayed in the video display region before the on the application display page in the preview mode, and the edited initial subtitle information may be displayed in the subtitle display region after the editing operation on the application display page in the preview mode. The relative positional relationship between the two display regions (the video display region before the extension and the subtitle display region after the editing operation) remains unchanged, while the sizes of the two display regions after the actual release may be different from the sizes of the two display regions provided in the preview mode. In this case, the subtitle display region after the editing operation may not be a subregion of the video display region. In order for the edited initial subtitle information to be fully displayed after the video is released, it is required to trigger the function of extending the video display region described in the embodiment of the present disclosure.

According to an embodiment of the present disclosure, after the extending the video display region within the region range corresponding to the application display page based on the first extension length and the first extension direction, the method further includes:

determining the edited subtitle information based on the editing operation and the initial subtitle information, in response to a detection of a video release instruction; and performing video synthesis on the video data and the edited subtitle information, to obtain video information carrying the edited subtitle information.

When the video release instruction is received, in general, in order to prevent the user from changing relevant attributes of video information, the client device may re-acquire video data. Similarly, the video data is encoded and rendered to obtain video information, and the video information is synthesized with the edited initial subtitle information, to obtain video information carrying the edited initial subtitle information. In addition, as described above, in the case where video information has been obtained by processing the video data before the editing operation, it is also possible to directly synthesize the video information and the edited initial subtitle information to obtain video information carrying the edited initial subtitle information.

According to an embodiment of the present disclosure, after the performing video synthesis on the video data and the edited subtitle information, to obtain the video information carrying the edited subtitle information, the method further includes: displaying the video information in the video display region before the extension.

As described above, the editing operation for the initial subtitle information triggers the extension of the video display region by the client device. In this embodiment, the video display region before the extension is generated by the client device adapting to the size of the application display page. In order to ensure the user experience of watching videos, after the video display region is extended, the region for displaying the video information does not change. That is, the video information is displayed in the video display region before the extension. In this way, the change of the subtitle display region does not affect the video display region. Therefore, the deformation of the video and other phenomena are avoided, and the display effect of the video is ensured.

An application scenario according to an embodiment of the present disclosure is described below with reference to FIG. 3.

The video data to be processed is processed, to obtain video information and initial subtitle information. The video information and the initial subtitle information are displayed in the preview mode. The video information may be displayed in the preview mode in the video display region before the extension, and the initial subtitle information may be displayed in the preview mode in the subtitle display region before the extension.

Figure 3:
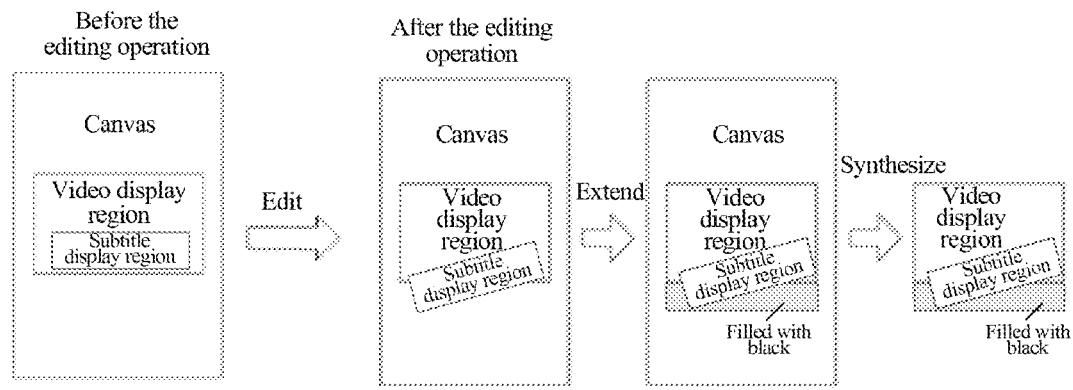
FIG. 3 is a schematic diagram of an application scenario according to an embodiment of the present disclosure.

Before the editing operation, as shown in FIG. 3, the subtitle display region (before the editing operation) is inside the video display region (before the extending operation). Thus, after the video is released, the initial subtitle information in the subtitle display region (before the editing operation) may be completely displayed.

The user may edit the initial subtitle information, such as adjusting the font size of the subtitle, adjusting the specific text content of the subtitle, and tilting the subtitle display region (before the editing operation). The subtitle display region after the editing operation is shown in FIG. 3. Similarly, the video information may be displayed in the preview mode at the video display region before the extension, and the edited initial subtitle information may be displayed in the preview mode at the subtitle display region after an editing operation. However, in this case, part of the subtitle display region (after the editing operation) is outside the video display region (before the extension). After the video is released, subtitles displayed outside the video display region (before the extension) may not be presented to the user.

In order to display the complete subtitles after the video is released, according to the present disclosure, the editing operation of the user for the subtitles may automatically trigger the function of extending the video display region of the client device. As shown in FIG. 3, the (extended) video display region includes the subtitle display region (after the editing operation). A newly added region may be filled with black. In this way, after detecting the video release instruction by the user, the client device synthesizes the video information and the edited initial subtitle information to obtain video information carrying the edited initial subtitle information. The video information carrying the edited initial subtitle information is displayed on the application display page. The final display situations after the video is released are that the video display region remains unchanged. That is, the video is still displayed in the video display region before the editing operation. In this way, the occurrence of the deformation of the video and other situations caused by the extension of the video display region are avoided; and the subtitles are fully displayed in the edited subtitle display region.

Figure 4:
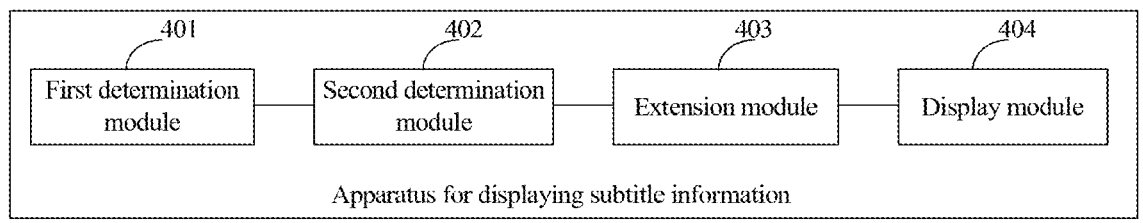
FIG. 4 is a schematic structural diagram of an apparatus for displaying subtitle information according to the present disclosure.

FIG. 4 is a schematic structural diagram of an apparatus for displaying subtitle information according to an embodiment of the present disclosure. The apparatus includes a first determination module 401, a second determination module 402, an extension module 403, and a display module 404.

The first determination module 401 is configured to determine a video display region in an application display page and a subtitle display region after an editing operation, in response to a detection of the editing operation of a user for initial subtitle information of video information.

The second determination module 402 is configured to determine a first extension length and a first extension direction for each of edges of the video display region based on region information of the video display region and region information of the subtitle display region, if the subtitle display region is not a subregion included in the video display region.

The extension module 403 is configured to extend the video display region within a region range corresponding to the application display page based on the first extension length and the first extension direction, where the extended video display region includes the subtitle display region.

The display module 404 is configured to display edited subtitle information in the subtitle display region.

According to an embodiment of the present disclosure, the editing operation includes at least one of:
adjusting a font color of a subtitle, adjusting a font size of the subtitle, adjusting a text content of the subtitle, adjusting a position of the subtitle display region, adjusting a size of the subtitle display region, and adjusting a shape of the subtitle display region.

According to an embodiment of the present disclosure, region information of any display region includes coordinates of endpoints of the display region.

The second determination module 402 is configured to:
determine a positional relationship between the video display region and the subtitle display region, based on coordinates of endpoints of the video display region and coordinates of endpoints of the subtitle display region;
determine the first extension direction for each of the edges of the video display region based on the positional relationship; and
determine, for each of the edges of the video display region, a coordinate of a first target endpoint from the coordinates of the endpoints of the video display region and a coordinate of a second target endpoint from the coordinates of the endpoints of the subtitle display region based on the first extension direction of the edge, and determine the first extension length of the edge based on the coordinate of the first target endpoint and the coordinate of the second target endpoint.

According to an embodiment of the present disclosure, the apparatus further includes an acquisition module, a sending module, and a receiving module.

Before the first determination module 401 detects the editing operation of the user for the initial subtitle information, the acquisition module is configured to acquire video data to be processed, and obtain audio information based on the video data.

The sending module is configured to send the audio information to a server, to obtain the initial subtitle information by the server performing text recognition on the audio information.

The receiving module is configured to receive the initial subtitle information from the server.

According to an embodiment of the present disclosure, the apparatus further includes a third determination module and a synthesis module.

After the extension module extends the video display region within the region range corresponding to the application display page based on the first extension length and the first extension direction, the third determination module is configured to determine the edited subtitle information based on the editing operation and the initial subtitle information, in response to a detection of a video release instruction.

The synthesis module is configured to perform video synthesis on the video data and the edited subtitle information, to obtain video information carrying the edited subtitle information.

According to an embodiment of the present disclosure, after the synthesis module performs video synthesis on the video data and the edited subtitle information, to obtain the video information carrying the edited subtitle information, the display module is further configured to display the video information in the video display region before extending.

Figure 5:
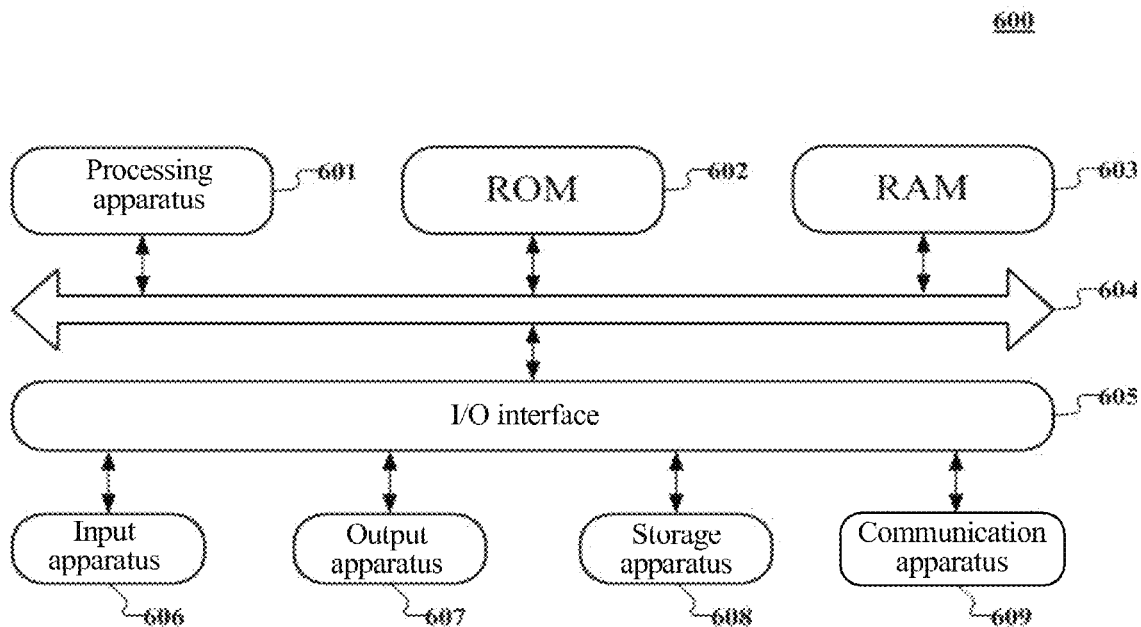
FIG. 5 is a schematic structural diagram of an electronic device according to the present disclosure.

Reference is made to FIG. 5, which is a schematic structural diagram of an electronic device (e.g., the client device in FIG. 1) 600 applicable to implement the embodiments of the present disclosure. The client device according to the embodiments of the present disclosure may be applied to mobile phones, laptops, digital broadcast receivers, PDAs (personal digital assistants), PADs (tablets), PMPs (portable multimedia players), vehicle-mounted terminals (such as in-vehicle navigation terminals) and other mobile terminals and fixed terminals such as digital TVs and desktop computers. The electronic device shown in FIG. 5 is only exemplary, and should not indicate any limitation to the function and scope of application of the embodiments of the present disclosure.

The electronic device includes a memory and a processor. The processor herein may be referred to as a processing apparatus 601 below. The memory may include at least one of a Read Only Memory (ROM) 602, a Random Access Memory (RAM) 603, and a storage apparatus 608. The details are as follows.

As shown in FIG. 5, the electronic device 600 may include a processing apparatus 601, such as a central processing unit (CPU) or a graphics processor, which may execute various operations and processing based on a program stored in a Read Only Memory (ROM) 602 or a program loaded from a storage apparatus 608 into a Random Access Memory (RAM) 603. Various programs and data are stored in the RAM 603, which are required by the electronic device 600 to perform an operation. The processing apparatus 601, the ROM 602 and the RAM 603 are connected to each other through a bus 604. An input/output (I/O) interface 605 is also connected to the bus 604.

Generally, the I/O interface 605 may be connected to: an input apparatus 606, such as a touch screen, a touch panel, a keyboard, a mouse, a camera, a microphone, an accelerometer, and a gyroscope; an output apparatus 607, such as a liquid crystal display (LCD), a speaker, and a vibrator; a storage apparatus 608 such as a magnetic tape and a hard disk; and a communication apparatus 609. The communication apparatus 609 enables wireless or wired communication between the electronic device 600 and other devices for data exchanging. Although FIG. 5 shows an electronic device 600 having various components, it should be understood that the illustrated components are not necessarily required to all be implemented or embodied. Alternatively, more or fewer apparatuses may be implemented or included.

Particularly, according to the embodiments of the present disclosure, the process described above in conjunction with flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 609, or installed from the storage apparatus 608, or installed from the ROM 602. When the computer program is executed by the processing apparatus 601, the functions defined in the method according to the embodiment of the present disclosure are performed.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a Random Access Memory (RAM), a Read Only Memory (ROM), an Erasable Programmable Read Only Memory (EPROM or flash memory), an optical fiber, a portable compact disc read only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, radio frequency and the like, or any proper combination thereof.

In some embodiments, the client and the server can communicate using any currently known or future developed network protocol such as HyperText Transfer Protocol (HTTP), and can be interconnected with any form or medium of digital data communication (e.g., a communication network). Examples of the communication network include a Local Area Network ("LAN"), a Wide Area Network ("WAN"), the internet (e.g., the Internet), a peer-to-peer network (e.g. an adhoc peer-to-peer network), and any currently known or future developed networks.

The computer readable medium may be incorporated in the electronic device, or may exist alone without being assembled into the electronic device.

The computer readable medium carries one or more programs. The one or more programs, when executed by the electronic device, cause the electronic device to: determine a video display region in an application display page and a subtitle display region after an editing operation, in response to a detection of the editing operation of a user for initial subtitle information of video information; determine a first extension length and a first extension direction for each of edges of the video display region based on region information of the video display region and region information of the subtitle display region, if the subtitle display region is not a subregion included in the video display region; extend the video display region within a region range corresponding to the application display page based on the first extension length and the first extension direction, where the extended video display region includes the subtitle display region; and display edited subtitle information in the subtitle display region.

The computer program code for performing the operations disclosed in the present disclosure may be written in one or more programming languages or combinations thereof. The programming languages include but are not limited to an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including a Local Area Network (LAN) or a Wide Area Network (WAN). For example, the remote computer may be connected through Internet connection by an Internet service provider.

Flowcharts and block diagrams in the drawings illustrate the architecture, functions and operations that can be implemented by a system, a method and a computer program produce according to various embodiments of the present disclosure. In this regard, each block in the flowchart or the block diagram may represent a module, a program segment, or a part of code. The module, the program segment, or the part of code includes one or more executable instructions used for implementing specified logic functions. It should be noted that, in some alternative implementations, the functions marked in blocks may be performed in an order different from the order shown in the drawings. For example, two blocks shown in succession may actually be executed substantially in parallel, or sometimes may be executed in a reverse order, which depends on the functions involved. It should be noted that each block in the block diagram and/or the flowchart, and a combination of the blocks in the block diagram and/or the flowchart may be implemented by a dedicated hardware-based system that performs the specified functions or operations, or may be realized by a combination of dedicated hardware and computer instructions.

The modules or units mentioned in the embodiments of the present disclosure may be implemented by means of software, or otherwise by means of hardware. In some circumstances, the name of the module or the unit does not constitute a limitation on the unit itself. For example, the first determination module may also be described as "a module for determining a video display region in an application display page and an a subtitle display region after an editing operation, in response to a detection of the editing operation of a user for initial subtitle information of video information".

The functions described herein above may be executed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine readable medium may be a tangible medium that may contain or store a program to be used by or in combination with an instruction execution system, apparatus or device. The machine readable medium may be a machine readable signal medium or a machine readable storage medium. The machine readable medium may include, but is not limited to, a system, an apparatus, or a device in an electronic, magnetic, optical, electromagnetic, infrared, or semi-conductive form, or any proper combination thereof. The machine readable storage medium may include an electrical connection based on one or more wires, a portable computer disk, a hard disk, a Random Access Memory (RAM), a Read Only Memory (ROM), an Erasable Programmable Read Only Memory (EPROM or flash memory), an optical fiber, a portable compact disc read only memory (CD-ROM), a light storage device, a magnetic storage device or any proper combination thereof.

According to one or more embodiments of the present disclosure, a method for displaying subtitle information is provided. The method includes:

determining a video display region in an application display page and an a subtitle display region after an editing operation, in response to a detection of the editing operation of a user for initial subtitle information of video information;

determining a first extension length and a first extension direction for each of edges of the video display region based on region information of the video display region and region information of the subtitle display region, if the subtitle display region is not a subregion included in the video display region;

extending the video display region within a region range corresponding to the application display page based on the first extension length and the first extension direction, where the extended video display region includes the subtitle display region; and displaying edited subtitle information in the subtitle display region.

According to an embodiment of the present disclosure, the editing operation includes at least one of the following:

adjusting a font color of a subtitle, adjusting a font size of the subtitle, adjusting a text content of the subtitle, adjusting a position of the subtitle display region, adjusting a size of the subtitle display region, and adjusting a shape of the subtitle display region.

According to an embodiment of the present disclosure, region information of any display region includes coordinates of endpoints of the display region.

The determining the first extension length and the first extension direction for each of the edges of the video display region based on the region information of the video display region and the region information of the subtitle display region includes:

determining a positional relationship between the video display region and the subtitle display region, based on coordinates of endpoints of the video display region and coordinates of endpoints of the subtitle display region;

determining the first extension direction for each of the edges of the video display region based on the positional relationship; and determining, for each of the edges of the video display region, a coordinate of a first target endpoint from the coordinates of the endpoints of the video display region and a coordinate of a second target endpoint from the coordinates of the endpoints of the subtitle display region based on the first extension direction of the edge, and determining the first extension length of the edge based on the coordinate of the first target endpoint and the coordinate of the second target endpoint.

According to an embodiment of the present disclosure, before the detecting the editing operation of the user for the initial subtitle information, the method further includes:

acquiring video data to be processed, and obtaining audio information based on the video data;

sending the audio information to a server, to obtain the initial subtitle information by the server performing text recognition on the audio information; and receiving the initial subtitle information from the server.

According to an embodiment of the present disclosure, after the extending the video display region within the region range corresponding to the application display page based on the first extension length and the first extension direction, the method further includes:

determining the edited subtitle information based on the editing operation and the initial subtitle information, in response to a detection of a video release instruction; and performing video synthesis on the video data and the edited subtitle information, to obtain video information carrying the edited subtitle information.

According to an embodiment of the present disclosure, after the performing video synthesis on the video data and the edited subtitle information, to obtain the video information carrying the edited subtitle information, the method further includes:

displaying the video information, in the video display region before extending.

According to one or more embodiments of the present disclosure, a schematic structural diagram of an apparatus for displaying subtitle information is further provided. The apparatus includes a first determination module, a second determination module, an extension module, and a display module.

The first determination module is configured to determine a video display region in an application display page and a subtitle display region after an editing operation, in response to a detection of the editing operation of a user for initial subtitle information of video information.

The second determination module is configured to determine a first extension length and a first extension direction for each of edges of the video display region based on region information of the video display region and region information of the subtitle display region, if the subtitle display region is not a subregion included in the video display region.

The extension module is configured to extend the video display region within a region range corresponding to the application display page based on the first extension length and the first extension direction, where the extended video display region includes the subtitle display region.

The display module is configured to display edited subtitle information in the subtitle display region.

According to an embodiment of the present disclosure, the editing operation includes at least one of:

adjusting a font color of a subtitle, adjusting a font size of the subtitle, adjusting a text content of the subtitle, adjusting a position of the subtitle display region, adjusting a size of the subtitle display region, and adjusting a shape of the subtitle display region.

According to an embodiment of the present disclosure, region information of any display region includes coordinates of endpoints of the display region.

The second determination module is further configured to:

determine a positional relationship between the video display region and the subtitle display region, based on coordinates of endpoints of the video display region and coordinates of endpoints of the subtitle display region;

determine the first extension direction for each of the edges of the video display region based on the positional relationship; and determine, for each of the edges of the video display region, a coordinate of a first target endpoint from the coordinates of the endpoints of the video display region and a coordinate of a second target endpoint from the coordinates of the endpoints of the subtitle display region based on the first extension direction of the edge, and determine the first extension length of the edge based on the coordinate of the first target endpoint and the coordinate of the second target endpoint.

According to an embodiment of the present disclosure, the apparatus further includes an acquisition module, a sending module, and a receiving module.

Before the first determination module detects the editing operation of the user for the initial subtitle information, the acquisition module is configured to acquire video data to be processed, and obtain audio information based on the video data.

The sending module is configured to send the audio information to a server, to obtain the initial subtitle information by the server performing text recognition on the audio information.

The receiving module is configured to receive the initial subtitle information from the server.

According to an embodiment of the present disclosure, the apparatus further includes a third determination module and a synthesis module.

After the extension module extends the video display region within the region range corresponding to the application display page based on the first extension length and the first extension direction, the third determination module is configured to determine the edited subtitle information based on the editing operation and the initial subtitle information, in response to a detection of a video release instruction.

The synthesis module is configured to perform video synthesis on the video data and the edited subtitle information, to obtain video information carrying the edited subtitle information.

According to an embodiment of the present disclosure, after the synthesis module performs video synthesis on the video data and the edited subtitle information, to obtain the video information carrying the edited subtitle information, the display module is further configured to display the video information in the video display region before extending.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, the scope of the present disclosure may cover a technical solution formed by replacing the features described above with technical features with similar functions disclosed in (but not limited to) the present disclosure.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments. Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for displaying subtitle information, comprising:
    determining a video display region in an application display page and en-a subtitle display region after an editing operation, in response to a detection of the editing operation of a user for initial subtitle information of video information;
    determining a first extension length and a first extension direction for each of edges of the video display region based on region information of the video display region and region information of the subtitle display region, if the subtitle display region is not a subregion comprised in the video display region;
    extending the video display region within a region range corresponding to the application display page based on the first extension length and the first extension direction, wherein the extended video display region comprises the subtitle display region; and
    displaying edited subtitle information in the subtitle display region.

2. The method according to claim 1, wherein the editing operation comprises at least one of:
    adjusting a font color of a subtitle, adjusting a font size of the subtitle, adjusting a text content of the subtitle, adjusting a position of the subtitle display region, adjusting a size of the subtitle display region, and adjusting a shape of the subtitle display region.

3. The method according to claim 1, wherein region information of any display region comprises coordinates of endpoints of the display region; and
    the determining the first extension length and the first extension direction for each of the edges of the video display region based on the region information of the video display region and the region information of the subtitle display region comprises:
    determining a positional relationship between the video display region and the subtitle display region, based on coordinates of endpoints of the video display region and coordinates of endpoints of the subtitle display region;
    determining the first extension direction for each of the edges of the video display region based on the positional relationship; and
    determining, for each of the edges of the video display region, a coordinate of a first target endpoint from the coordinates of the endpoints of the video display region and a coordinate of a second target endpoint from the coordinates of the endpoints of the subtitle display region based on the first extension direction of the edge, and determining the first extension length of the edge based on the coordinate of the first target endpoint and the coordinate of the second target endpoint.

4. The method according to claim 1, wherein before the detecting the editing operation of the user for the initial subtitle information, the method further comprises:
    acquiring video data to be processed, and obtaining audio information based on the video data;
    sending the audio information to a server, to obtain the initial subtitle information by the server performing text recognition on the audio information; and
    receiving the initial subtitle information from the server.

5. The method according to claim 4, wherein after the extending the video display region within the region range corresponding to the application display page based on the first extension length and the first extension direction, the method further comprises:
    determining the edited subtitle information based on the editing operation and the initial subtitle information, in response to a detection of a video release instruction; and
    performing video synthesis on the video data and the edited subtitle information, and obtaining video information carrying the edited subtitle information.

6. The method according to claim 5, wherein after the obtaining video information carrying the edited subtitle information, the method further comprises:
    displaying the video information, in the video display region before extending.

7. An apparatus for displaying subtitle information, comprising:
    a memory; and
    a processor,
    wherein a computer program is stored in the memory; and the computer program, when executed by a processor, causes the processor to
    determine a video display region in an application display page and a subtitle display region after an editing operation, in response to a detection of the editing operation of a user for initial subtitle information of video information;
    determine a first extension length and a first extension direction for each of edges of the video display region based on region information of the video display region and region information of the subtitle display region, if the subtitle display region is not a subregion comprised in the video display region;
    extend the video display region within a region range corresponding to the application display page based on the first extension length and the first extension direction, wherein the extended video display region comprises the subtitle display region; and
    display edited subtitle information in the subtitle display region.

8. The apparatus according to claim 7, wherein the editing operation comprises at least one of:
    adjusting a font color of a subtitle, adjusting a font size of the subtitle, adjusting a text content of the subtitle, adjusting a position of the subtitle display region, adjusting a size of the subtitle display region, and adjusting a shape of the subtitle display region.

9. The apparatus according to claim 7, wherein region information of any display region comprises coordinates of endpoints of the display region; and
    the computer program, when executed by a processor, causes the processor to:
    determine a positional relationship between the video display region and the subtitle display region, based on coordinates of endpoints of the video display region and coordinates of endpoints of the subtitle display region;
    determine the first extension direction for each of the edges of the video display region based on the positional relationship; and
    determine, for each of the edges of the video display region, a coordinate of a first target endpoint from the coordinates of the endpoints of the video display region and a coordinate of a second target endpoint from the coordinates of the endpoints of the subtitle display region based on the first extension direction of the edge, and determine the first extension length of the edge based on the coordinate of the first target endpoint and the coordinate of the second target endpoint.

10. The apparatus according to claim 7, wherein the computer program, when executed by a processor, causes the processor further to:
- acquire video data to be processed, and obtain audio information based on the video data;
- send the audio information to a server, to obtain the initial subtitle information by the server performing text recognition on the audio information; and
- receive the initial subtitle information from the server.

11. The apparatus according to claim 10, wherein the computer program, when executed by a processor, causes the processor to:
- determine the edited subtitle information based on the editing operation and the initial subtitle information, in response to a detection of a video release instruction; and
- perform video synthesis on the video data and the edited subtitle information, and obtain video information carrying the edited subtitle information.

12. The apparatus according to claim 11, wherein the computer program, when executed by a processor, causes the processor to:
- display the video information, in the video display region before extending.

13. A non-transitory computer readable medium storing a computer program thereon, wherein the computer program, when executed by a processor, causes the processor to
- determine a video display region in an application display page and a subtitle display region after an editing operation, in response to a detection of the editing operation of a user for initial subtitle information of video information;
- determine a first extension length and a first extension direction for each of edges of the video display region based on region information of the video display region and region information of the subtitle display region, if the subtitle display region is not a subregion comprised in the video display region;
- extend the video display region within a region range corresponding to the application display page based on the first extension length and the first extension direction, wherein the extended video display region comprises the subtitle display region; and
- display edited subtitle information in the subtitle display region.

14. The non-transitory computer readable medium according to claim 13, wherein the editing operation comprises at least one of:
- adjusting a font color of a subtitle, adjusting a font size of the subtitle, adjusting a text content of the subtitle, adjusting a position of the subtitle display region, adjusting a size of the subtitle display region, and adjusting a shape of the subtitle display region.

15. The non-transitory computer readable medium according to claim 13, wherein region information of any display region comprises coordinates of endpoints of the display region; and
the computer program, when executed by a processor, causes the processor to:
- determine a positional relationship between the video display region and the subtitle display region, based on coordinates of endpoints of the video display region and coordinates of endpoints of the subtitle display region;
- determine the first extension direction for each of the edges of the video display region based on the positional relationship; and
- determine, for each of the edges of the video display region, a coordinate of a first target endpoint from the coordinates of the endpoints of the video display region and a coordinate of a second target endpoint from the coordinates of the endpoints of the subtitle display region based on the first extension direction of the edge, and determine the first extension length of the edge based on the coordinate of the first target endpoint and the coordinate of the second target endpoint.

16. The non-transitory computer readable medium according to claim 13, wherein the computer program, when executed by a processor, causes the processor further to:
- acquire video data to be processed, and obtain audio information based on the video data;
- send the audio information to a server, to obtain the initial subtitle information by the server performing text recognition on the audio information; and
- receive the initial subtitle information from the server.

17. The non-transitory computer readable medium according to claim 16, wherein the computer program, when executed by a processor, causes the processor to:
- determine the edited subtitle information based on the editing operation and the initial subtitle information, in response to a detection of a video release instruction; and
- perform video synthesis on the video data and the edited subtitle information, and obtain video information carrying the edited subtitle information.

18. The non-transitory computer readable medium according to claim 17, wherein the computer program, when executed by a processor, causes the processor to:
- display the video information, in the video display region before extending.

* * * * *